United States Patent [19]

Lim

[11] Patent Number: 5,434,622
[45] Date of Patent: Jul. 18, 1995

[54] IMAGE SIGNAL ENCODING APPARATUS USING ADAPTIVE FRAME/FIELD FORMAT COMPRESSION

[75] Inventor: Jong-Tae Lim, Seoul, Rep. of Korea

[73] Assignee: Daewoo Electronics Co., Ltd., Seoul, Rep. of Korea

[21] Appl. No.: 118,440

[22] Filed: Sep. 8, 1993

[30] Foreign Application Priority Data

Sep. 9, 1992 [KR] Rep. of Korea ............... 92-16455

[51] Int. Cl.⁶ .................................................. H04N 7/50
[52] U.S. Cl. ................................. 348/400; 348/404; 348/407
[58] Field of Search ............... 348/400, 404, 407, 446; H04N 7/133, 7/137

[56] References Cited

U.S. PATENT DOCUMENTS 4,837,617  6/1989  Brusewitz ............... 348/400
5,091,782  2/1992  Krause ................... 348/400

*Primary Examiner*—Howard W. Britton
*Attorney, Agent, or Firm*—William F. Pinsak

[57] ABSTRACT

Compression of blocks of digital data is optimized by optimally selecting between frame and field format compression on a block-by-block basis. Specifically, a set of pixel data presented in a field format is compressed to provide a field compressed image signal. The set of pixel data is also presented in a frame format to provide a frame compressed image signal. The field and the frame compressed image signals are quantified; and the compressed image signal having the lesser amount of bits is then selected. The selection effectively improves the quality of the transmitted signal and reduces the structural complexity and manufacturing cost of the image signal encoding apparatus.

2 Claims, 2 Drawing Sheets

IMAGE SIGNAL ENCODING APPARATUS USING ADAPTIVE FRAME/FIELD FORMAT COMPRESSION

FIELD OF THE INVENTION

The present invention relates to an image signal encoding apparatus for compressing image signals; and, more particularly, to an improved image signal encoding apparatus capable of compressing image signals for the transmission thereof through the use of a combined frame/field format compression technique.

DESCRIPTION OF THE PRIOR ART

In various electronic/electrical applications such as high definition television ("HDTV") and video telephone systems, an image signal may need to be transmitted in a digitized form. When the image signal comprising a sequence of image "frames" is expressed in a digitized form, there is bound to occur a substantial amount of digital data: for each line of an image frame is defined by a sequence of digital data elements referred to as "pixels". Since, however, the available frequency bandwidth of a conventional transmission channel is limited, in order to transmit the substantial amounts of digital data through the limited channel, the use of an image signal encoding apparatus often becomes necessary to compress the image signal.

The image signal can be normally compressed without seriously affecting its integrity because there usually exist certain correlationships among some of the pixels in a single frame and also among those of neighboring frames. From the image signal compression perspective, such correlation may be considered as a redundancy.

Accordingly, most image signal encoding apparatus of prior art employ various compression techniques (or coding methods) built on the idea of utilizing or reducing the redundancies. Such compression techniques can be classified into three categories.

A first category of compression techniques is the so-called predictive method, also known as the interframe coding, which is based on the concept of reducing the redundancy between neighboring frames. In the predictive method, the luminance value of a pixel in a current (or present) frame to be transmitted is predicted from the luminance value of its corresponding, previously transmitted pixel in its previous frame, then the differences between the luminance values of the pixels in the current frame and the predicted values are compressed (or coded); and the compressed data is then transmitted.

A predictive method of late utilizes a motion estimation and compensation method. This method is described, for example, by Staffan Ericsson in "Fixed and Adaptive Predictors for Hybrid Predictive/Transform Coding", *IEEE Transactions on Communications*, COM-33, No. 12 (December 1985); and by Ninomiya and Ohtsuka in "A Motion-Compensated Interframe Coding Scheme for Television Pictures", *IEEE Transactions on Communications*, COM-30, No. 1 (January 1982), both of which are incorporated herein by reference. In this method, an image frame is divided into a plurality of subimages (or blocks). The size of a subimage typically ranges between 8×8 and 32×32 pixels. The motion estimation and compensation is a process of determining the movement of objects between a current frame and its previous frame, and predicting the current frame according to the motion flow.

A second category of coding methods comprises a transform technique which utilizes the redundancy existing in a single frame. This coding technique, which exploits only the spatial correlation, is also called the intraframe coding. One of such transform methods is a two-dimensional DCT (Discrete Cosine Transform). This technique is described in Chen and Pratt, "Scene Adaptive Coder", *IEEE Transactions Communications*, COM-32, No. 3 (March 1984), which is incorporated herein by reference. The two-dimensional DCT converts a block of digital image signal, for example, a block of 8×8 pixels, into a set of transform coefficient data. By processing such transform coefficient data with a variable length coding (VLC) method such as run-length Huffman coding, the amount of data to be transmitted can be effectively compressed.

A third category of compression techniques makes use of the so-called hybrid coding, which is a combination of the first and the second categories of techniques.

Currently, the hybrid coding method is most commonly employed. Also, to increase the compressibility of image signals, the apparatus may employ other additional compression algorithms adapted to specific conditions.

Normally, interlaced scanning is used to define a television picture. That is to say, each frame of a television picture comprises a plurality of horizontal lines (e.g., 525 lines in a standard NTSC television system), which are divided into even and odd lines: wherein the even lines (lines 2,4,6, . . . ) form an even field and the odd lines (line 1,3,5, . . . ) form an odd field. The even and odd fields are scanned in an alternating order to interleave the even and odd lines and provide the picture information in a proper sequence. The use of such interlaced scanning complicates the task of compressing television signals, however.

A digitized interlaced television signal can be compressed in various formats. In one format, referred to herein as the "field format", each frame is separated into its two, i.e., even and odd, fields which are processed independently. In another format, referred to as the "frame format", the two fields are processed as a single frame by interleaving the corresponding lines of even and odd fields in order.

As is generally known, the frame processing works better than the field processing when there is little or no motion. For, since each frame has twice the number of lines or pixels than a field for a given picture height, there will be more correlationships or redundancies between the pixels; and, hence, better compressibility may be obtained. To achieve the same accuracy as the frame processing, the field processing would require a higher bit rate. Thus, for an equal number of bit rates, the frame processing achieves a greater accuracy.

In briskly moving areas, however, it is generally more efficient to compress data in the field format. In such cases, the frame processing will suffer a lower level of redundancy or correlation between the previous and current frames; and, therefore, the effectiveness of compression algorithm gets deteriorated.

As mentioned above, each of the format processing techniques has its advantages. Consequently, it is sometimes desirable to compress image signals using an adaptive field/frame format compression technique.

One of the prior art image signal encoding apparatus using such adaptive field/frame compression is disclosed in U.S. Pat. No. 5,091,782 issued to Edward A. Krause, et al. According to the Krause technique, compression of digital data is carried out by selecting different data formats on a block-by-block basis. A set of pixel data presented in a field format is compressed in a field format compression path to provide a field format compressed image signal. The set of pixel data is also presented in a frame format and compressed in a frame format compression path to provide a frame format compressed image signal. Errors are evaluated in the field and the frame compression paths separately. The compressed image signal having a lesser error is then selected.

While the above prior art image signal encoding apparatus using adaptive frame/field format compression is capable of providing a compression system which combines the advantages of both processing techniques to a certain extent, it requires frame/field format selection means which can objectively select the more efficient compression format. Specifically, the prior art frame/field format selection means utilizes an error evaluation device which determines the error, for example, between the quantized transform coefficients and the unquantized transform coefficients in each compression path. However, since the conventional frame/field format selection means relies on the degree of distortion of an image signal which may occur while going through the field or frame format compression (rather than the compression bit rates as in the present invention), it is not designed to select the compressed image signal with a higher redundancy or greater compression effectiveness.

Further, the prior error evaluation device makes use of subtractors, absoluters, accumulators and a comparator. Employing such, the error evaluating means is apt to incur an increase in the complexity of the image signal encoding apparatus, which may in turn entail an increased manufacturing cost of the apparatus.

SUMMARY OF THE INVENTION

It is, therefore, an object of the invention to provide an improved image signal encoding apparatus which is capable of compressing image signals by employing an adaptive frame/field format compression technique.

It is another object of the invention to provide an improved image signal encoding apparatus adapted to select a more efficient compression format with ease.

It is a further object of the invention to provide an improved image signal encoding apparatus which is capable of simplifying the structural complexity of the image signal encoding apparatus and thereby reducing the manufacturing cost thereof.

In accordance with the invention, there is provided an improved apparatus for processing a digitized image signal for transmission in a compressed form, comprising: first means for compressing the digitized image signal in a field format to provide a first compressed image signal; second means for compressing the digitized image signal in a frame format to provide a second compressed image signal; and a comparator for comparing the number of bits contained in said first compressed image signal and that contained in said second compressed image signal so as to enable the selection of the compressed image signal with a smaller number of bits.

BRIEF DESCRIPTION OF THE DRAWINGS

The above and other objects and features of the present invention will become apparent from the following description of the preferred embodiments given in conjunction with the accompanying drawings in which.

DETAILED DESCRIPTION OF THE PREFERRED EMBODIMENTS

Figure 1A:
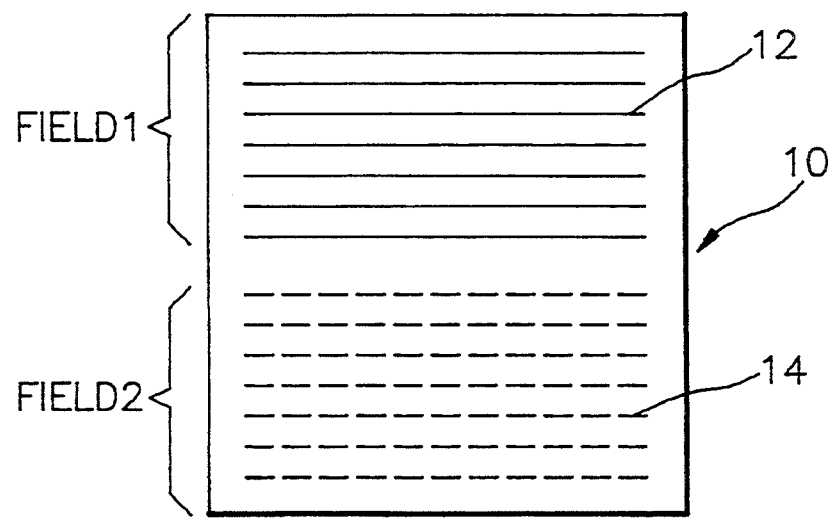
FIG. 1A is a diagram depicting an image frame separated into odd and even fields for the field processing of pixel data.

FIG. 1A illustrates a single image frame 10 separated into its two component fields. Field 1 designated by reference numeral 12 comprises the odd numbered lines of the image frame. Field 2 represented by reference numeral 14 comprises the even numbered lines of the image frame. In prior art analog television systems, each of the even and odd lines of the image frame is defined by an analog signal modulated with image information. The lines from the even and odd fields are interleaved in sequence to provide an intelligible image picture.

Figure 1B:
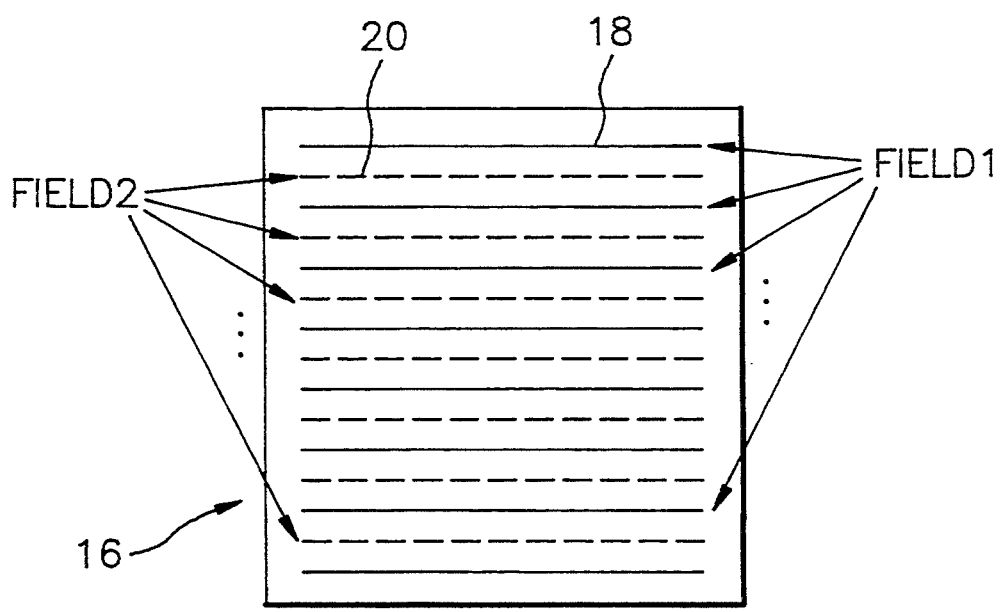
FIG. 1B is a diagram illustrating an image frame having interleaved even and odd lines for the frame processing of pixel data.

FIG. 1B illustrates an interlaced image frame 16. Odd numbered lines 18 from Field 1 are interleaved with even numbered lines 20 from Field 2. The even and odd lines must be interleaved in this fashion in order for a proper picture to appear on a television screen.

Field processing of image data in the format as shown in FIG. 1A is generally preferred in briskly moving areas. Frame processing, which may be depicted by the format of FIG. 1B, generally works better than the field processing when there is little or no motion. The present invention provides a system that optimizes the compression of digitized image data by suitably switching to select between the field format processing and the frame format processing.

Figure 2:
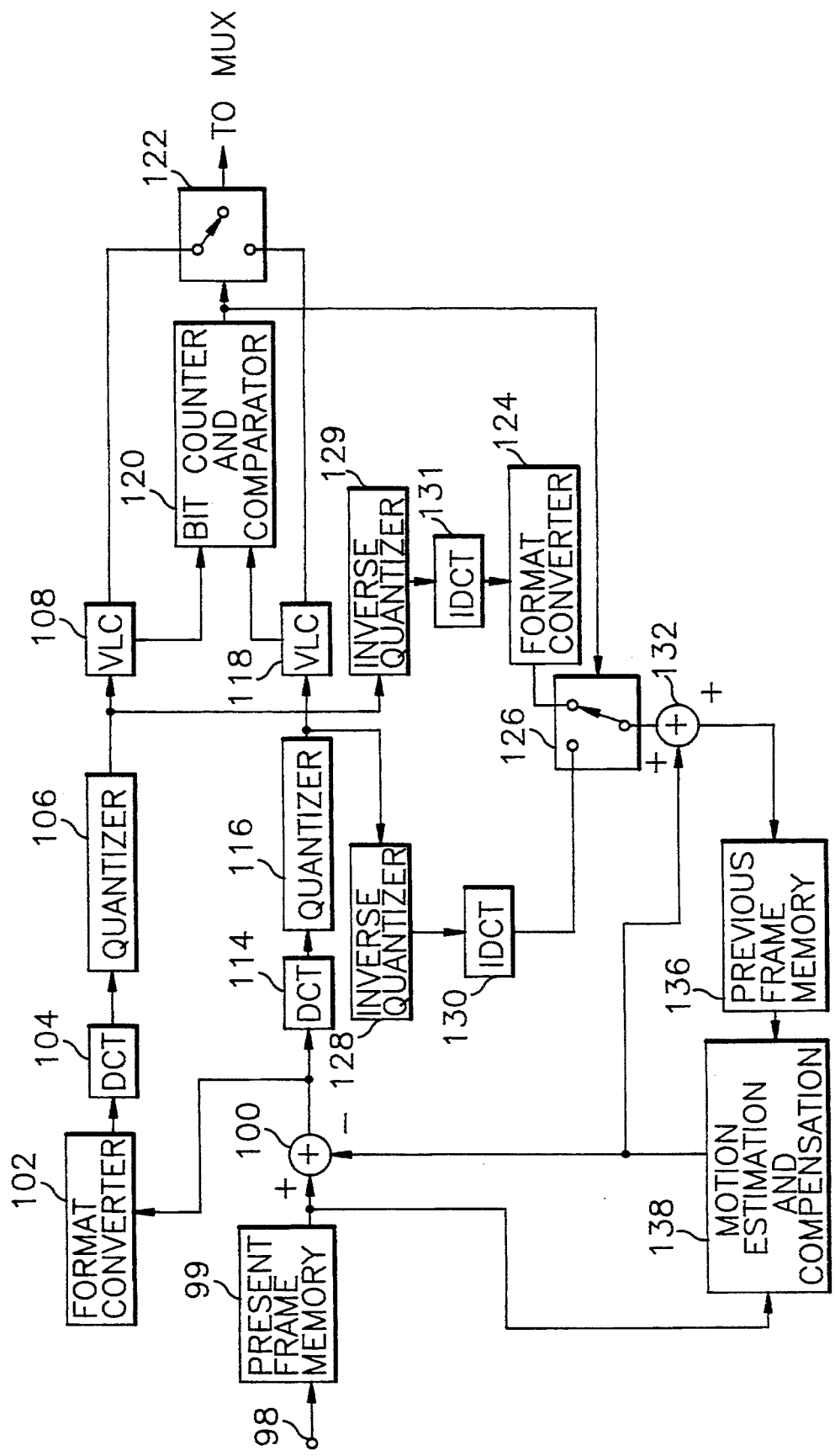
FIG. 2 is a block diagram of an image signal encoding apparatus using the adaptive frame/field format compression in accordance with the invention.

FIG. 2 illustrates an image signal encoding apparatus using the adaptive frame/field format compression in accordance with a preferred embodiment of the present invention. Image data such as the interlaced image signal shown in FIG. 1B is provided through a terminal 98 to a present frame memory 99. The image data defined by the interlaced image signal is decomposed at the present frame memory 99 into blocks of a size appropriate for data compression.

The blocks of data are then fed to a subtractor 100 and a motion estimation and compensation block 138. The image data in the present frame memory 99 is predicted by the motion estimation and compensation block 138 based on the image data of its preceding image frame stored in a previous frame memory 136. The predicted image data from the motion estimation and compensation block 138 is subtracted from the image data for the present frame at the subtractor 100 to produce a set of image data representing a prediction error. The prediction error is presented to a field and a frame format compression paths for compression and selection as further described below.

The interlaced image data, i.e., frame format data, is provided to the field format compression path comprising a format converter 102, a DCT block 104, a quantizer 106 and a variable length coder (VLC) 108. The frame format data is similarly provided to the frame format compression path comprising a DCT block 114, a quantizer 116 and a VLC 118.

The format converter 102 in the field format compression path is used to convert the frame format data into the field format data. The format converter 102 is described, for example, in U.S. Pat. No. 5,091,782 mentioned above, which is incorporated herein by reference.

The field format data is compressed through the DCT block 104, the quantizer 106 and the VLC 108, which are conventional elements used in an image signal encoding apparatus. The DCT block 104 transforms the field format data into a set of field transform coefficients. The quantizer 106 quantizes the set of field transform coefficients to provide a field quantization signal. The VLC 108 encodes the field quantization signal to provide the compressed image signal.

Similarly, the frame format data is compressed through the DCT block 114, the quantizer 116 and the VLC 118 in the frame format compression path. The DCT block 114 transforms the frame format data into a set of frame transform coefficients. The quantizer 116 quantizes the set of frame transform coefficients to provide a frame quantization signal. The VLC 118 encodes the frame quantization signal to provide the compressed image signal.

Once the field format data, after the conversion from the frame format data at the converter 102, is compressed in the field format compression path and the frame format data is compressed in the frame format compression path, the compressed data to be used for transmission is selected as follows. The selection is made by counting the amount of data contained in each format of the compressed signal. In accordance with the present invention, a bit counter and comparator 120 is used to select one of the compression paths for a given block of image data. In the bit counter and comparator 120, the total number of bits produced in the field format compression path is compared with that of the frame format compression path on a block-by-block basis. The compression path producing a lesser amount of bits will be selected for a given block. The selection result is identified by a decision bit. The decision bit (e.g., a "0" for frame format data and a "1" for field format data) is used to actuate switches 122 and 126. The bit counter and comparator 120 may comprise a prior art hardware bit counter coupled to a comparator. Alternatively, its functions can be implemented in software using well known techniques in the art.

When the decision bit output from the bit counter and comparator 120 indicates the selection of, e.g., the field format compression path, switch 122 is set to transmit the field format data to a multiplexer (not shown). When the decision bit indicates the selection of the frame format compression path, switch 122 operates to couple the frame format compression path to the multiplexer. The compressed data and the decision bit are multiplexed at the multiplexer and sent to a conventional transmitter for data transmission.

In order to obtain a prediction for the next frame, inverse quantizers (IQs) 128 and 129, and inverse DCT (IDCT) blocks 130 and 131 perform the reverse processing of the frame and the field format compression, respectively. The output signal of the inverse DCT block 130 is provided to the switch 126 which is actuated by the decision bit; while the output signal of the inverse DCT block 131 is provided through a format converter 124, which is used for converting the field format back to the frame format, to the switch 126. The selected data from the switch 126 is added back at an adder 132 to the prediction image data that was initially subtracted at the subtractor 100. The result is written into the previous frame memory 136 (e.g., a shift register or RAM) where it is stored until it can be used for the next frame prediction.

As shown above, the present invention provides an improved image signal encoding apparatus for use in digital data compression by using an adaptive frame/field format compression, and, particularly, for use in the transmission of digitized interlaced television signals. The invention may be advantageously used in the transmission of, e.g., HDTV signals, as effective means for substantially reducing the amount of data to be transmitted to define HDTV television pictures, while utilizing the benefits of both frame and field format compression.

The selective use of the compression format in accordance with the invention has been found to be particularly effective in improving the image quality of digitally transmitted image signals and in reducing the structural complexity of the hardware and manufacturing cost of the image signal encoding apparatus.

While the present invention has been shown and described with reference to the particular embodiments, it will be apparent to those skilled in the art that many changes and modifications may be made without departing from the spirit and scope of the invention as defined in the appended claims.

What is claimed is:

1. An image signal encoding apparatus for processing a digitized image signal in a frame format for transmission in a compressed form, comprising:

first compression means for compressing the digitized image signal in the frame format to provide a first compressed image signal;

format converting means for converting the digitized image signal from the frame format into a field format;

second compression means for compressing the digitized image signal in the field format to provide a second compressed image signal;

means for counting and comparing the number of bits contained in said first compressed image signal and that contained in said second compressed image signal, so as to enable the selection between the first and the second compressed image signals with a smaller number of bits.

2. The apparatus in accordance with claim 1, wherein said first compression means includes a frame transformer for transforming the digitized image signal in the frame format into a set of frame transform coefficients, a frame quantizer for quantizing the set of frame transform coefficients to provide a frame quantization signal, and a frame variable length coder for encoding the frame quantization signal to provide the first compressed image signal; and said second means comprising a field transformer for transforming the digitized image signal in the field format into a set of field transform coefficients, a field quantizer for quantizing the set of field transform coefficients to provide a field quantization signal, and a field variable length coder for encoding the field quantization signal to provide the second compressed image signal.

* * * * *